Dec. 19, 1933.   O. H. SIEWEK   1,940,275
CAM LOCK
Filed April 17, 1930
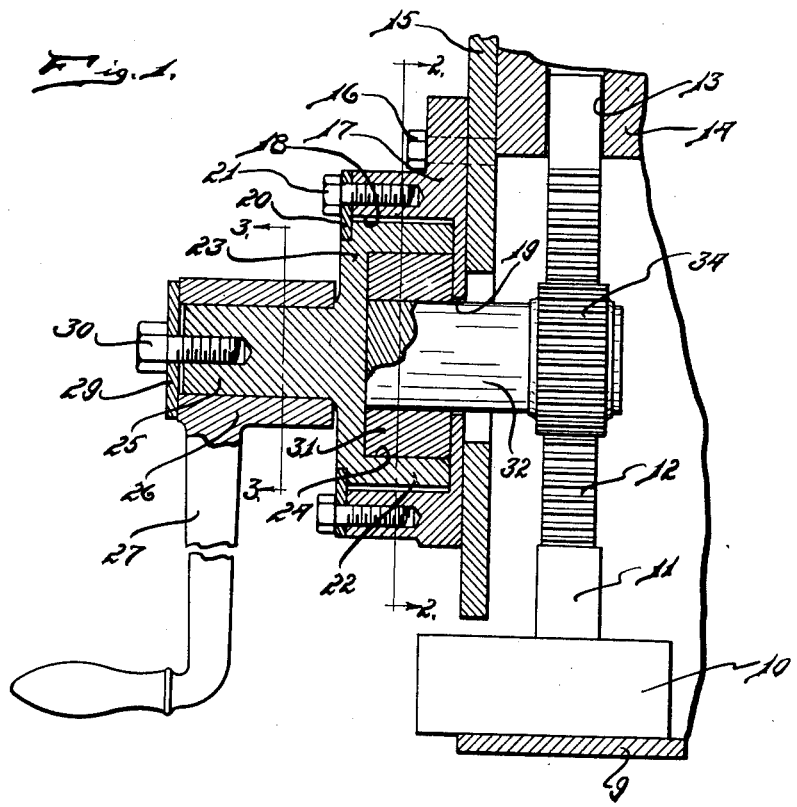
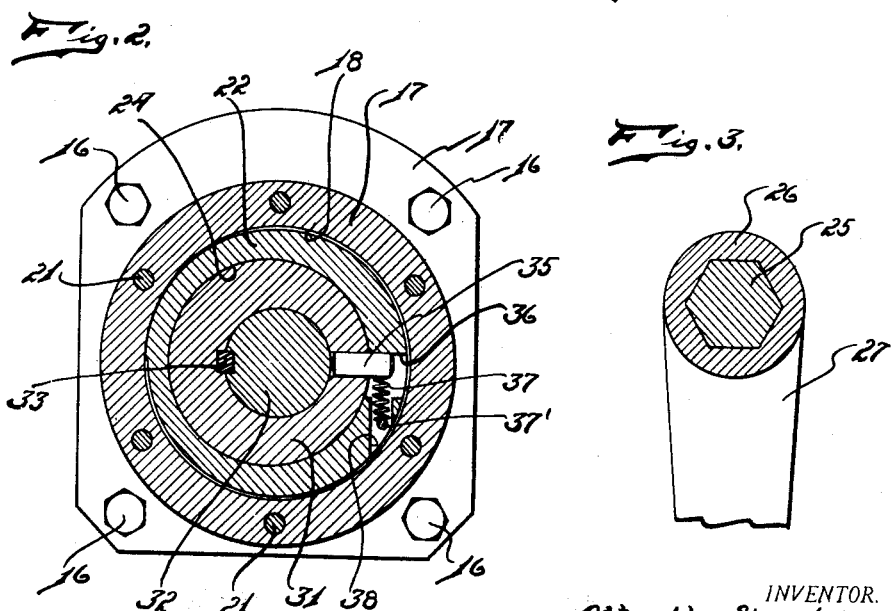
INVENTOR.
Otto H. Siewek
BY
Thos. Donnell
ATTORNEY.

Patented Dec. 19, 1933

1,940,275

UNITED STATES PATENT OFFICE 1,940,275

CAM LOCK

Otto H. Siewek, Detroit, Mich.

Application April 17, 1930. Serial No. 445,019

12 Claims. (Cl. 192—8)

My invention relates to a new useful improvement in a cam-lock and has for its object the provision of a cam-lock which will be simple in structure, economical of manufacture and highly efficient in use.

Another object of the invention is the provision of a cam-lock, having a rotatable part, engageable with a rotatable cam for effecting a locking of the rotatable part upon its rotation to a predetermined position.

Another object of the invention is the provision in a cam of this class having a rotatable part of a pair of annular members eccentrically mounted on said rotatable part in embracing relation.

Other objects will appear hereinafter.

The invention consists in the combination and arrangement of parts hereinafter described and claimed.

The invention will be understood best by reference to the accompanying drawing which forms a part of this specification, and in which, Fig. 1 is a central sectional view.

Fig. 2 is a sectional view taken on line 2—2 of Fig. 1.

Fig. 3 is a fragmentary sectional view taken on line 3—3 of Fig. 1.

In the drawing I have illustrated the invention adapted for use in retaining a plunger or clamp 11, when desired, in position for clamping, the work-piece 10 against the table 9. The clamping member 11 is extended to provide the rack-bar 12 and projected through an opening 13 formed in the supporting structure 14. Secured to the face plate 15 by means of screws 16 is a retaining block 17. A circular recess 18 is formed in the member 17. An opening 19 is formed centrally in the reduced portion of the member 17. A retaining ring 20 secured to the member 17 by screw bolts 21 serves to retain the cup-shaped member 23, rotatably mounted therein.

The bore or inner surface 24 of this cup-shaped member 23 is formed eccentrically, as clearly appears in Fig. 2. Projecting outwardly from the base of the cup-shaped member 23 is the stub shaft 25 on which is secured the hub 26, carrying the handle or crank 27. A retaining plate 29 is held in position to engage the outer face of the hub 26 by means of the screw bolt 30 threaded into the stub shaft 25. Positioned within the cup-shaped member 23 is the collar or locking ring 31, which is keyed to a shaft 32 by the key 33 eccentrically. A pinion 34 is mounted on the shaft 32 and adapted to mesh with the rack bar 12.

Projected outwardly from the locking ring 31 is a pin 35 which extends into the slot 36 formed in the cylindrical portion 22 of the cup-shaped member. A spring 37 engages, at one end, the pin 35 and, at the opposite end, a pin 37' which is positioned in the recess 38 formed in the cylindrical portion 22.

In operation, in order to move the clamping plunger 11 into clamping engagement with the work-piece 10, the shaft 32 would be rotated counter-clockwise. To effect this rotation the cup-shaped member 23 would be rotated counter-clockwise. In this movement the portion 22, through the engagement of the spring 37 with the pin 35 and through frictional contact, which, of course, would be slight, would effect a rotation of the lock ring 31 and the shaft 32 in counter-clockwise direction. When the clamping plunger 11 would move into engagement with the work-piece 10 so that resistance would be offered to the rotation of the locking ring 31 and the shaft 32, relative movement of the locking ring 31 and the cylindrical portion 22 of the cup-shaped member would be effected against the compression of the spring 37. Because of the eccentric relation of these parts 22 and 31 a locking of the same against relative movement would be effected so that a locking of the clamping member 11, in position, would be accomplished.

The members 22 and 31 may be considered as locking rings.

The locking and releasing of the parts is easily and quickly effected by this structure, and it will be noted that a minimum number of parts is used and that no adjustment of any of the parts is required.

While I have illustrated and described the preferred form of construction, I do not wish to limit myself to the precise details of structure shown but desire to avail myself of such variations and modifications as come within the scope of the appended claims.

Having thus described my invention, what I claim as new and desire to secure by Letters Patent is:

1. A device of the class described, comprising: a reciprocatory clamping member; a rotatable means for effecting a reciprocation of said clamping member; an annular member mounted eccentrically of said rotatable member and a second annular member embracing said first mentioned annular member eccentrically thereof; means for rotating said eccentric members in unison with each other and in unison with said rotatable means, said eccentric members being relatively movable upon resistance of said rotatable means to rotation reaching a predetermined degree.

2. A device of the class described, comprising: a reciprocatory clamping member; a rotatable shaft; a gear mounted on and rotatable in unison with said shaft for effecting reciprocation of said clamping member upon rotation of said shaft; an annular member fixedly mounted on said shaft in embracing relation eccentric thereto; and means for effecting a rotation of said shaft, said means co-operating with said annular member for locking said shaft against rotation upon resistance of said shaft to rotation reaching a predetermined amount.

3. A device of the class described, comprising: a clamping member; means for moving said clamping member into clamping relation with the object to be clamped; eccentric means carried by said moving means; and means co-operating with said eccentric means for effecting a movement of said moving means, and locking said moving means against movement upon resistance of the same to movement reaching a predetermined amount.

4. A device of the class described comprising: a clamping member; a rack on said clamping member; a shaft; a gear on said shaft meshing with said rack for effecting reciprocation of said clamping member upon rotation of said shaft in opposite directions; an annular member eccentrically mounted on said shaft; an annular member embracing said first mentioned annular member eccentrically thereof and adapted for locking said eccentrics against rotation upon resistance of said shaft to rotation, reaching a predetermined amount.

5. A device of the class described, comprising: a reciprocatory rack bar; a clamping member carried by one end of said rack bar; a supporting plate; a retaining block mounted on said plate and having a circular recess formed therein; a circular cup shaped member mounted and rotatable in said recess, the inside of said cup shaped member being eccentric; a gear meshing with said rack bar; a stub shaft on said gear and projected inwardly of said recess centrally thereof; an annular locking collar fixedly mounted eccentrically on said stub shaft and engaging within said cup shaped member; a pin projecting radially outwardly from said collar and engaging in an elongated slot formed in the side of said cup shaped member; and a chordally extended spring mounted on said cup shaped member and projecting into said slot and engaging at one end said pin for normally retaining the same positioned at one end of said slot.

6. A device of the class described, comprising: a reciprocatory rack bar; a clamping member carried by one end of said rack bar; a supporting plate; a retaining block mounted on said plate and having a circular recess formed therein; a circular cup shaped member mounted and rotatable in said recess, the inside of said cup shaped member being eccentric; a gear meshing with said rack bar; a stub shaft on said gear and projected inwardly of said recess centrally thereof; an annular locking collar fixedly mounted eccentrically on said stub shaft and engaging within said cup shaped member; a pin projecting radially outwardly from said collar and engaging in an elongated slot formed in the side of said cup shaped member; a chordally extended spring mounted on said cup shaped member and projecting into said slot and engaging at one end said pin for normally retaining the same positioned at one end of said slot; and means for retaining said cup shaped member in said recess.

7. A clamp operating and locking means comprising a clamping means, an operating means for the clamping means, a pair of eccentrically related members, one on the clamping means and the other on the operating means, and means to operate the operating means for engagement of the member thereof with the member on the clamping means to first operate the clamping means for a work clamping operation and then releasably lock the members against voluntary release thereof upon resistance offered by said clamping.

8. A clamp operating and locking means comprising a rotatable shaft for operating a clamping means and having an eccentric part, a rotatable member having an eccentric part in clamping and locking relation with the first mentioned part, said shaft and said member being rotatable on one axis, and a handle to rotate said rotatable member for a work clamping operation and locking engagement of said part thereof with the first said part.

9. A clamp operating and locking means comprising a housing, a clamping means operating shaft journaled in said housing and having an eccentric part, a member journaled in said housing and on said shaft and having an eccentric part in clamping means operating and locking relation with the first mentioned part, and a handle to rotate said member for a work clamping operation and locking engagement of said part thereof with the first said part.

10. A clamp operating and locking means comprising a rotatable clamping means operating shaft having an eccentric part, a rotatable member having an eccentric part in clamp operating and locking relation with the first mentioned part, an abutment mechanism between said parts for limitation of movement between the same, and means for rotation of said rotatable member.

11. A jig comprising a shaft operated clamping mechanism and a locking means comprising a stationary member having a bore concentric with the axis of the shaft, a member in said bore and having a counterbore eccentric with said axis, a member on and rotatable with the shaft and having a part thereof eccentric with said axis and extending into said counterbore, and an operating crank on said member having the counterbore.

12. A clamp operating and locking means comprising a pair of members eccentrically related one over the other for wedging, one moving the other in one direction for work clamping and automatically locking said members against voluntary release thereof after clamping work and in another direction for automatically releasing the locking and unclamping of the work.

OTTO H. SIEWEK.